United States Patent
Suzuki et al.

(10) Patent No.: US 8,374,717 B2
(45) Date of Patent: Feb. 12, 2013

(54) VIBRATION SUPPRESSING METHOD AND VIBRATION SUPPRESSING DEVICE FOR MACHINE TOOL

(75) Inventors: Norikazu Suzuki, Nagoya (JP); Eiji Shamoto, Nagoya (JP); Hiroshi Ueno, Aichi (JP)

(73) Assignees: Okuma Corporation, Niwa-Gun (JP); National University Corporation Nagoya University, Nagoya-shi (JP)

( * ) Notice: Subject to any disclaimer, the term of this patent is extended or adjusted under 35 U.S.C. 154(b) by 548 days.

(21) Appl. No.: 12/606,821

(22) Filed: Oct. 27, 2009

(65) Prior Publication Data
US 2010/0104388 A1    Apr. 29, 2010

(30) Foreign Application Priority Data
Oct. 28, 2008    (JP) .................. 2008-277139

(51) Int. Cl.
*G06F 19/00*    (2011.01)
*G01B 3/00*    (2006.01)
*B23Q 11/00*    (2006.01)

(52) U.S. Cl. .......... 700/174; 700/177; 700/159; 702/56; 702/33; 409/141; 409/131

(58) Field of Classification Search .................. 700/174
See application file for complete search history.

(56) References Cited

U.S. PATENT DOCUMENTS

| | | | | |
|---|---|---|---|---|
| 4,025,724 A | * | 5/1977 | Davidson et al. | 700/280 |
| 4,417,489 A | * | 11/1983 | Liu | 82/1.11 |
| 4,435,751 A | * | 3/1984 | Hori et al. | 700/280 |
| 5,898,984 A | * | 5/1999 | Chiba et al. | 29/33 T |
| 5,921,731 A | * | 7/1999 | Chandrasekar | 409/231 |
| 5,955,856 A | * | 9/1999 | Sato et al. | 318/560 |
| 6,085,121 A | * | 7/2000 | Stern | 700/175 |
| 6,223,102 B1 | * | 4/2001 | Busch | 700/279 |

(Continued)

FOREIGN PATENT DOCUMENTS

| | | |
|---|---|---|
| JP | 2001517557 A | 10/2001 |
| JP | 2003340627 A | 12/2003 |

(Continued)

OTHER PUBLICATIONS

Deng, C. and Yang, X., "A Local Fitting Algorithm for Converting Planar Curves to B-Splines", Oct. 25, 2007, Department of Mathematics, Zhejiang Unversity, Computer Aided Geometric Design, vol. 25, Iss. 9.*

(Continued)

*Primary Examiner* — Mohammad Ali
*Assistant Examiner* — Kelvin Booker
(74) *Attorney, Agent, or Firm* — Arent Fox LLP

(57) ABSTRACT

A vibration suppressing method and a vibration suppressing device are disclosed. After a tool is attached to a main spindle, a modal parameter of the tool or a workpiece is computed. Thereafter, a relation between chatter frequency and phase difference is calculated as an approximation formula based on the obtained modal parameter and machining conditions. If chatter vibration occurs after initiation of the machining, a chatter frequency corresponding to a target phase difference is obtained using the approximation formula, and based on the obtained chatter frequency, the number of tool flutes and the main spindle rotation speed, the optimum rotation speed is calculated. The rotation speed of the main spindle is then changed in accordance with the obtained optimum rotation speed.

5 Claims, 15 Drawing Sheets

U.S. PATENT DOCUMENTS

| | | | | |
|---|---|---|---|---|
| 6,697,759 | B2* | 2/2004 | Saarinen et al. | 702/145 |
| 6,748,300 | B2* | 6/2004 | Sato | 700/181 |
| 6,883,373 | B2* | 4/2005 | Dyer | 700/164 |
| 7,155,973 | B2* | 1/2007 | Dyer | 700/164 |
| 7,381,017 | B2* | 6/2008 | Wang et al. | 700/280 |
| 7,501,783 | B2* | 3/2009 | Imadu et al. | 700/275 |
| 7,540,697 | B2* | 6/2009 | Wang et al. | 409/141 |
| 8,005,574 | B2* | 8/2011 | Inagaki | 700/280 |
| 8,014,903 | B2* | 9/2011 | Inagaki | 700/280 |
| 2005/0160811 | A1* | 7/2005 | Dyer | 73/462 |
| 2008/0289923 | A1* | 11/2008 | Suzuki et al. | 408/143 |
| 2009/0069927 | A1* | 3/2009 | Suzuki et al. | 700/177 |
| 2009/0110499 | A1* | 4/2009 | Inagaki | 408/143 |
| 2009/0248203 | A1* | 10/2009 | Nakamura et al. | 700/251 |
| 2010/0010662 | A1* | 1/2010 | Inagaki | 700/175 |
| 2010/0263167 | A1* | 10/2010 | Fox | 16/400 |
| 2011/0135415 | A1* | 6/2011 | Hamaguchi et al. | 409/79 |

FOREIGN PATENT DOCUMENTS

| | | | |
|---|---|---|---|
| JP | 2007-044852 | | 2/2007 |
| JP | 2008290164 A | * | 12/2008 |
| JP | 2008290186 A | * | 12/2008 |
| JP | 2008290194 A | * | 12/2008 |

OTHER PUBLICATIONS

Pottmann, H; Leopoldseder, S.; and Hofer, M, "Approximation with active B-spline curves and surfaces", 2002, Proceedings of the 10$^{th}$ Pacific Conference on Computer Graphics and Applications, ISBN 0-7695-1784-6.*

Yang, H.; Wang, W.; and Sun, J., "Control point adjustment for B-spline curve approximation", 2004, Computer-Aided Design, vol. 36, pp. 639-652.*

Ozturk, E.; Tunc, L.T.; and Budak, E., "Machining Parameter and Strategy Selection in Multi-Axis Milling of Sculptured Surfaces", Jun. 2007, 4$^{th}$ International Conference and Exhibition on Design and Production of Machines and Dies/Molds, Cesme, Turkey.*

Pamali, A.P., "Using Clothoidal Spirals to Generate Smooth Tool Paths for High Speed Machining", Spring 2004, Thesis for Master of Science in Industrial Engineering, North Carolina State University, Raleigh, NC.*

Spence, A.D.; Abrari, F.; and Elbestawi, M.A., "Integrated Solid Modeler Based Solutions for Machining", 1999, 5$^{th}$ Symposium on Solid Modeling.*

Wang, H.; Jang, P.; and Stori, J.A., "A Metric-Based Approach to 2D Tool-Path Optimization for High-Speed Machining", 2002, American Society of Mechanical Engineers, Manufacturing Engineering Division, MED, vol. 13, pp. 139-148.*

Y. Altintas et al.; "Analytical Prediction of Stability Lobes in Milling"; Manufacturing Automation Laboratory, Dept. of Mechanical Engineering, The University of British Columbia, Vancouver, BC, Canada; Annals of the CIRP; vol. 44; pp. 357-362.

"Workshop material and papers," 2001—JSME (Japan Society of Mechanical Engineers), Basic knowledge of cuttting works and chatter vibration, pp. 11-22.

Chinese Office Action in counterpart Chinese Patent Application dated Nov. 28, 2012.

Thesis for Degree, Liaoning Technical University.

1994-2012 China Academic Journal Electronic Publishing House. http://www.cnki.net . . . pp. 10-16.

* cited by examiner

VIBRATION SUPPRESSING METHOD AND VIBRATION SUPPRESSING DEVICE FOR MACHINE TOOL

This application claims the benefit of Japanese Patent Application Number 2008-277139 filed on Oct. 28, 2008, the entirety of which is incorporated by reference.

BACKGROUND OF THE INVENTION

1. Field of the Invention

The present invention relates to a vibration suppressing method and a vibration suppressing device for a machine tool which is provided with a rotary shaft for rotating a tool or a workpiece to machine the workpiece, and more particularly to a vibration suppressing method and a vibration suppressing device for preventing deterioration of a machining surface and shortening of tool life due to chatter vibration generated during machining of the workpiece.

2. Description of Related Art

In an end mill machining, chatter vibration occurs in accordance with machining conditions such as a cutting amount and a rotation speed of a rotary shaft, which will result in deterioration of a machining surface. The chatter vibration will damage the tool, resulting in shortening of the tool life.

A technique for suppressing chatter vibration is known from Non-patent document 1, and a vibration suppressing method utilizing the technique above is known from Patent document 1. According to the vibration suppressing method, in order to suppress regenerative chatter vibration as self-excited vibration which will cause deterioration of an accuracy in finishing the machining surface, the natural frequency of a chatter vibration-generating system of a tool, a workpiece and the like is obtained by impulsive excitation of the tool or the workpiece, and the obtained natural frequency is increased 60 times and then divided by the number of tool flutes and a predetermined integer to obtain a value which is an optimum rotation speed. Machining of the workpiece is performed using the obtained optimum rotation speed.

Meanwhile, other than the use of the natural frequency of the machine tool, a calculation method using chatter frequency during chatter being occurred is also known from Non-patent document 2 and Patent document 2. According to the disclosure of Patent document 2, an acoustic sensor is arranged in proximity of the tool or the workpiece so as to detect vibrational frequency during the rotation of the tool or the work, and a chatter frequency during machining is obtained based on the detected vibrational frequency. The obtained chatter frequency is increased 60 times and then divided by the number of tool flutes and a predetermined integer to obtain an optimum rotation speed. However, Non-patent document 2 shows that a divisor corresponding to the actual stable range is not equal to an integral multiple of the number of tool flutes. The decimal part of the divisor indicates a phase difference between the surface created by the currently used cutting blade and the surface created by the previous cutting blade, and the rotation speed with no phase difference is obtained as a stable rotation speed in Patent document 2. However, according to Non-patent document 2, an actual optimum rotation speed is slightly higher than the rotation speed with no phase difference. Therefore, the method disclosed in Patent document 2 causes an error in the optimum rotation speed by the phase difference. It is known that a correlation exists between the phase information and the optimum rotation speed, and chatter vibration may be suppressed by obtaining the rotation speed corresponding to the phase information which is to be stable.

Patent document 1: Japanese Laid-open Patent Publication No. 2003-340627

Patent document 2: Japanese Patent Publication No. 2001-517557 for Published Japanese translation of PCT application Non-patent document 1: CIRP, Vol. 44/1 (1995) Analytical Prediction of Stability Lobes in Milling Non-patent document 2: Workshop material and papers, 2001-JSME (Japan Society of Mechanical Engineers), Basic knowledge of cutting works and chatter vibration However, the vibration suppressing method as disclosed in Patent document 1 requires an expensive impulse device, and an excitation using the impulse device requires advanced techniques and great care. Further, in most cases, the natural frequency measured in advance of machining with the impulsive excitation or the like tends to differ from the natural frequency during the actual machining, and therefore it is difficult to accurately obtain the optimum rotation speed based on this method.

Further, since chatter frequency changes in accordance with rotation speed, in order to accurately obtain the optimum rotation speed, it is necessary to obtain the chatter frequency corresponding to the optimum rotation speed. For this reason, according to the vibration suppressing method as disclosed in Patent document 2 in which the measured chatter frequency is used as it is, it is difficult to accurately obtain the optimum rotation speed.

In the meantime, as described above, chatter vibration may be suppressed by obtaining the rotation speed corresponding to the phase information which is to be stable. However, for this reason it is necessary to obtain the chatter frequency corresponding to the intended phase information. Although the phase information and the rotation speed corresponding to a certain chatter frequency can be calculated based on the method as disclosed in Non-patent document 2, it is very difficult to perform inverse transformation using this calculating formula. As a result, from a practical standpoint of view, it is difficult to analytically obtain the chatter frequency corresponding to the intended phase information. Therefore, a calculation should be repeated while sweeping the chatter frequency within a certain definite range, and a certain chatter frequency by which the obtained phase information is sufficiently close to the intended phase information has to be used.

In view of the above disadvantages, the present invention seeks to provide a vibration suppressing method and a vibration suppressing device for a machine tool, which can readily and highly accurately obtain the optimum rotation speed for effectively suppressing chatter vibration, without requiring heavy-loaded repeated computations.

The present invention has been made in an attempt to eliminate the above disadvantages, and illustrative, non-limiting embodiments of the present invention overcome the above disadvantages and other disadvantages not described above.

SUMMARY OF THE INVENTION

In order to achieve the above object, according to a first aspect of the present invention, there is provided a method of suppressing chatter vibration of a machine tool during machining of a workpiece, the machine tool being provided with a rotary shaft for rotating a tool or the workpiece, assuming that a decimal part of a value obtained by the following formula:

$$60 \times \text{Chatter frequency} / (\text{Number of Tool flutes} \times \text{Rotation speed of Rotary shaft})$$

is given as phase information, the method comprising: a first step of attaching the tool to the rotary shaft and computing a modal parameter of the tool or the workpiece; a second step of calculating a relation between chatter frequency and the phase information as an approximation formula based on the modal parameter and machining conditions; a third step of detecting time-domain vibration caused by the chatter vibration; a fourth step of calculating a chatter frequency and a frequency-domain characteristic value of the calculated chatter frequency based on the vibration detected in the third step; and a fifth step of obtaining a chatter frequency corresponding to the phase information that has been selected as a target using the approximation formula if the characteristic value calculated in the fourth step exceeds a predetermined threshold value, and thereafter calculating an optimum rotation speed using the obtained chatter frequency and the number of tool flutes.

According to a second aspect of the present invention, in the second step, the approximation formula is expressed by a Bézier curve or a B-spline curve.

According to a third aspect of the present invention based on the present invention or the second aspect of the present invention, the method further comprises calculating phase information from the formula of the present invention using the chatter frequency calculated in the fourth step and the rotation speed of the rotary shaft corresponding to the chatter frequency, and correcting the modal parameter or the approximation formula using the obtained chatter frequency and the phase information.

According to a fourth aspect of the present invention, there is provided a vibration suppressing device for suppressing chatter vibration of a machine tool during machining of a workpiece, the machine tool being provided with a rotary shaft for rotating a tool or the workpiece, assuming that a decimal part of a value obtained by the following formula:

$$60 \times \text{Chatter frequency}/(\text{Number of Tool flutes} \times \text{Rotation speed of Rotary shaft})$$

is given as phase information, the vibration suppressing device comprising: a determination unit configured to compute a modal parameter of the tool or the workpiece while the tool is attached to the rotary shaft; a first calculation unit configured to calculate a relation between chatter frequency and the phase information of the tool flutes as an approximation formula based on the modal parameter and machining conditions; a vibration detecting unit configured to detect time-domain vibration caused by the chatter vibration; a second calculation unit configured to calculate a chatter frequency and a frequency-domain characteristic value of the calculated chatter frequency based on the vibration detected by the vibration detecting unit; and a third calculation unit configured to obtain a chatter frequency corresponding to the phase information that has been selected as a target using the approximation formula if the characteristic value calculated by the second calculation unit exceeds a predetermined threshold value and thereafter to calculate an optimum rotation speed using the obtained chatter frequency and the number of tool flutes.

With the above configurations of the vibration suppressing method and the vibration suppressing device according to the first and the fourth aspects of the present invention, it is possible to readily and highly accurately obtain the optimum rotation speed for analytically suppressing chatter vibration, without requiring repeated computations which are heavy-loaded and involve less accurate solutions.

With the above configuration of the second aspect of the present invention, in addition to the above advantageous effects of the first aspect of the present invention, the approximation formula can be readily provided using a Bézier curve or a B-spline curve which functions as an approximation formula indicating the relation between chatter frequency and phase information.

With the above configuration of the third aspect of the present invention, in addition to the above advantageous effects, an appropriate optimum rotation speed can be obtained in accordance with a change in the machining state by correcting the approximation formula or the modal parameter per se where necessary based on the actual machining data.

BRIEF DESCRIPTION OF THE DRAWINGS

The above aspect, other advantages and further features of the present invention will become more apparent by describing in detail illustrative, non-limiting embodiments thereof with reference to the accompanying drawings, in which.

DETAILED DESCRIPTION OF THE EXEMPLARY EMBODIMENTS

With reference to the accompanying drawings, one preferred embodiment of the present invention will be described in detail.

Figure 1:
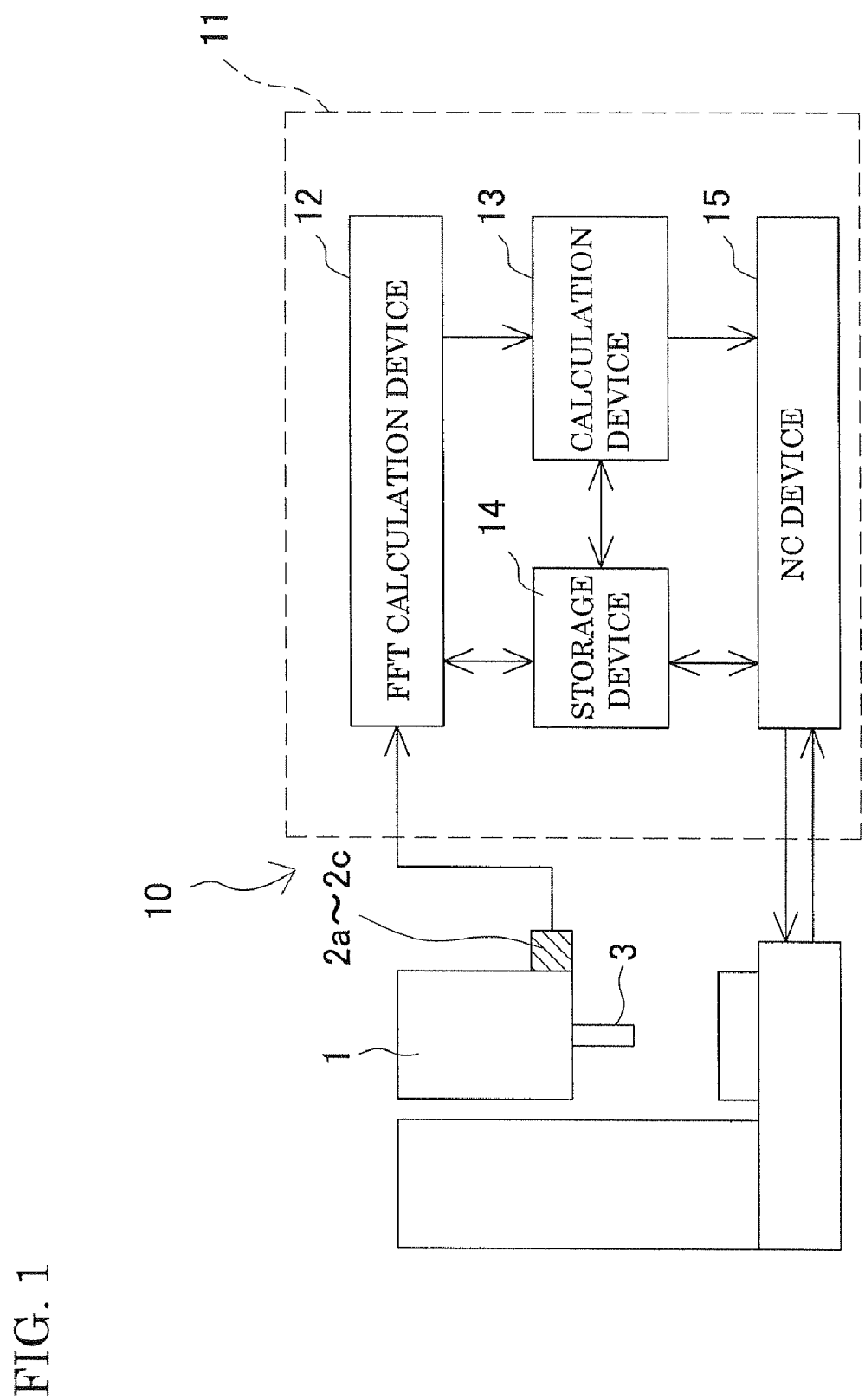
FIG. 1 is a block diagram of a vibration suppressing device according to the present invention.
Figure 2:
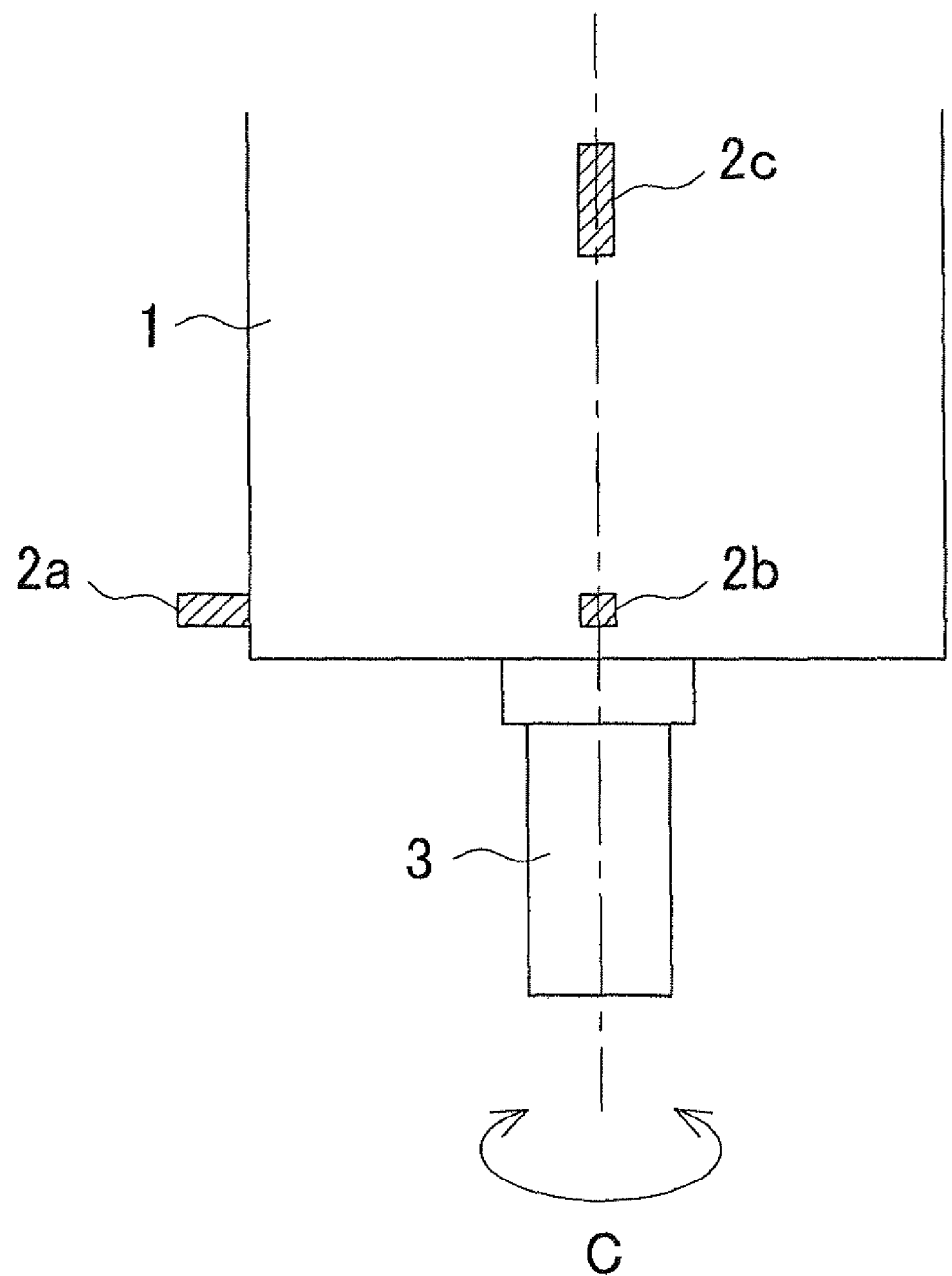
FIG. 2 is a side view of a main spindle housing.
Figure 3:
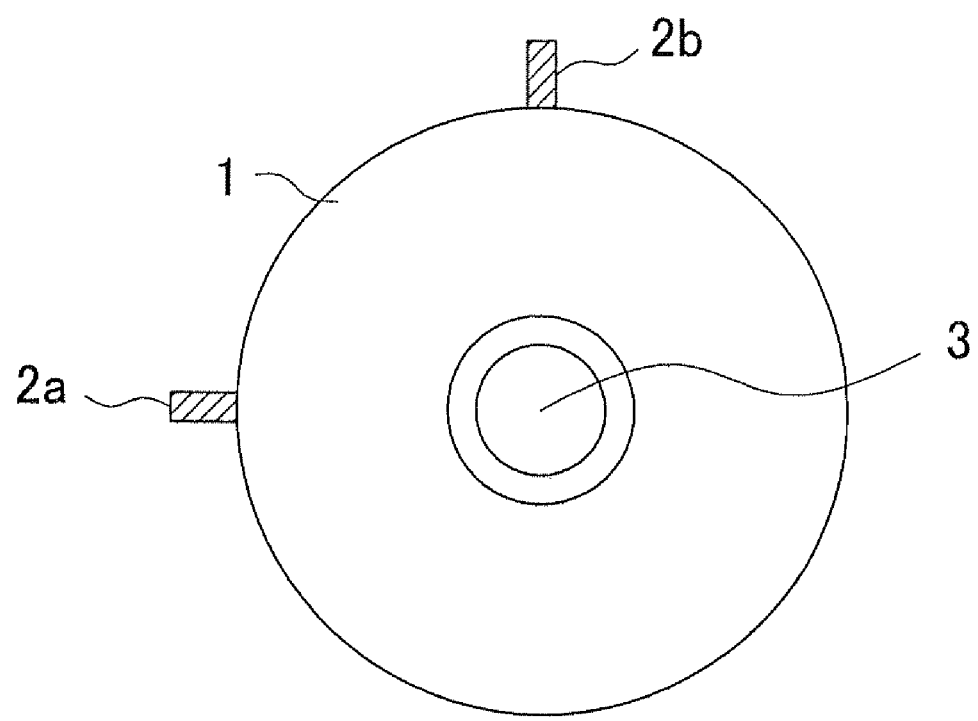
FIG. 3 is a top view of the main spindle housing.

Among the attached drawings, FIG. 1 is a block diagram of a vibration suppressing device according to one embodiment of the present invention, FIG. 2 is a side view of a main spindle housing of a machine tool, and FIG. 3 is a top view of the main spindle housing as seen from an axial direction of the main spindle.

A vibration suppressing device 10 is configured to control chatter vibration generated at a main spindle 3 as a rotary shaft that is provided on a main spindle hosing 1 in such a manner as to be rotatable around a C-axis. The vibration suppressing device 10 comprises vibration sensors 2a-2c as vibration detecting units configured to detect time-domain vibrational acceleration (vibrational acceleration on a time axis) which occurs on the main spindle 3 while rotating, and a controller 11 configured to control the rotation speed of the main spindle 3 based on the detection values of the vibration sensors 2a-2c. In order to detect vibrational acceleration and rotation speed in directions at right angles from one another, the vibration sensors 2a-2c are attached to the main spindle housing 1 such that they can detect time-domain vibrational acceleration in X-axis, Y-axis and Z-axis directions which intersect at right angles.

Further, the controller 11 comprises: an FFT calculation device 12 (determination unit, first calculation unit, and second calculation unit) configured to perform Fourier analysis based on the vibrational acceleration detected by the vibration sensors 2a-2c; a calculation device 13 (third calculation unit) configured to perform a calculation, etc. of an optimum rotation speed based on the value calculated with the FFT calculation device 12; a storage device 14 configured to store numerical values calculated with the FFT calculation device 12 and the calculation device 13, a threshold value for determining an occurrence of chatter vibration, the number of tool flutes, and the like; and an NC device 15 (rotation control unit) configured to control machining at the main spindle housing 1.

Figure 4A:
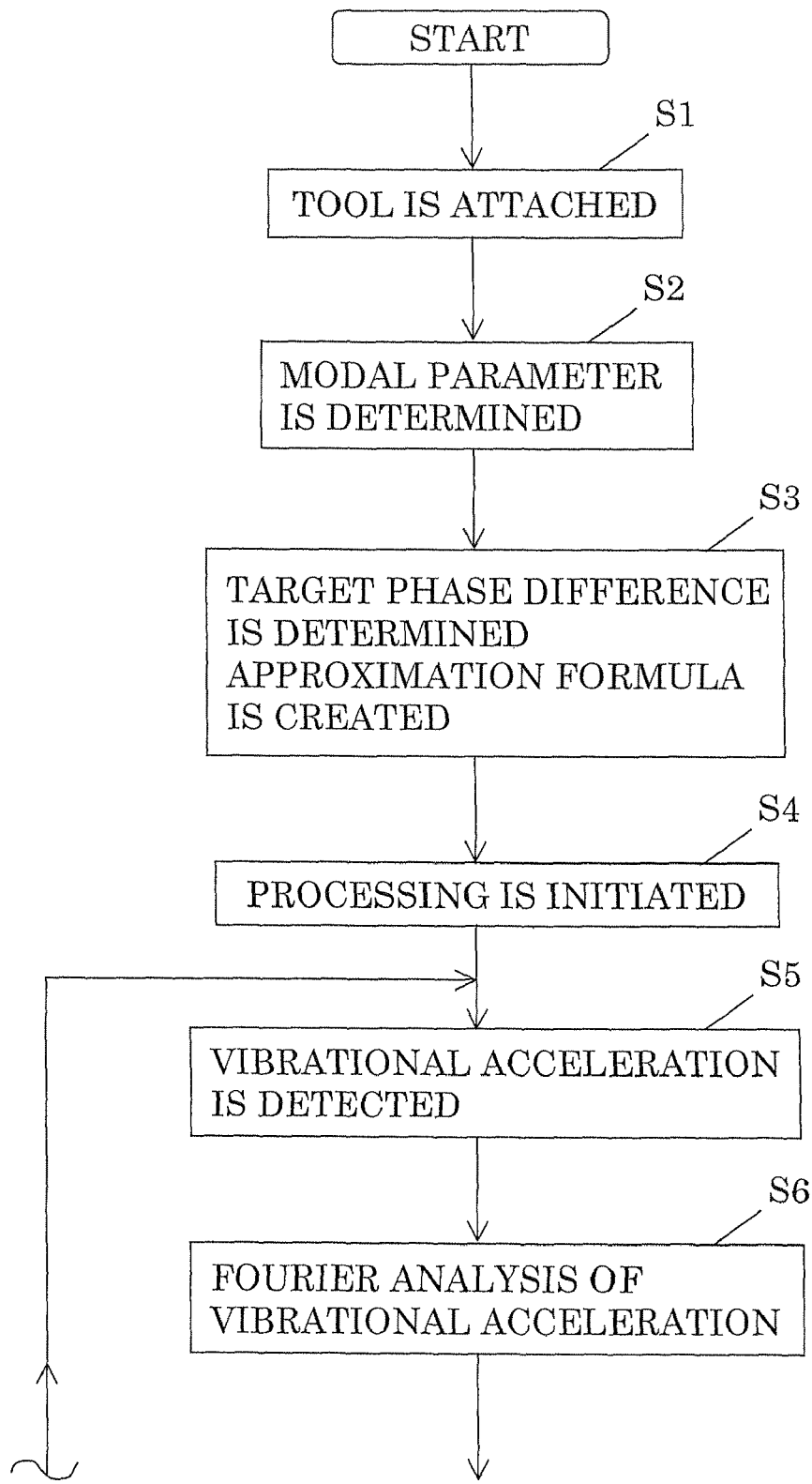
FIG. 4 is a flow chart for vibration suppression control.
Figure 4B:
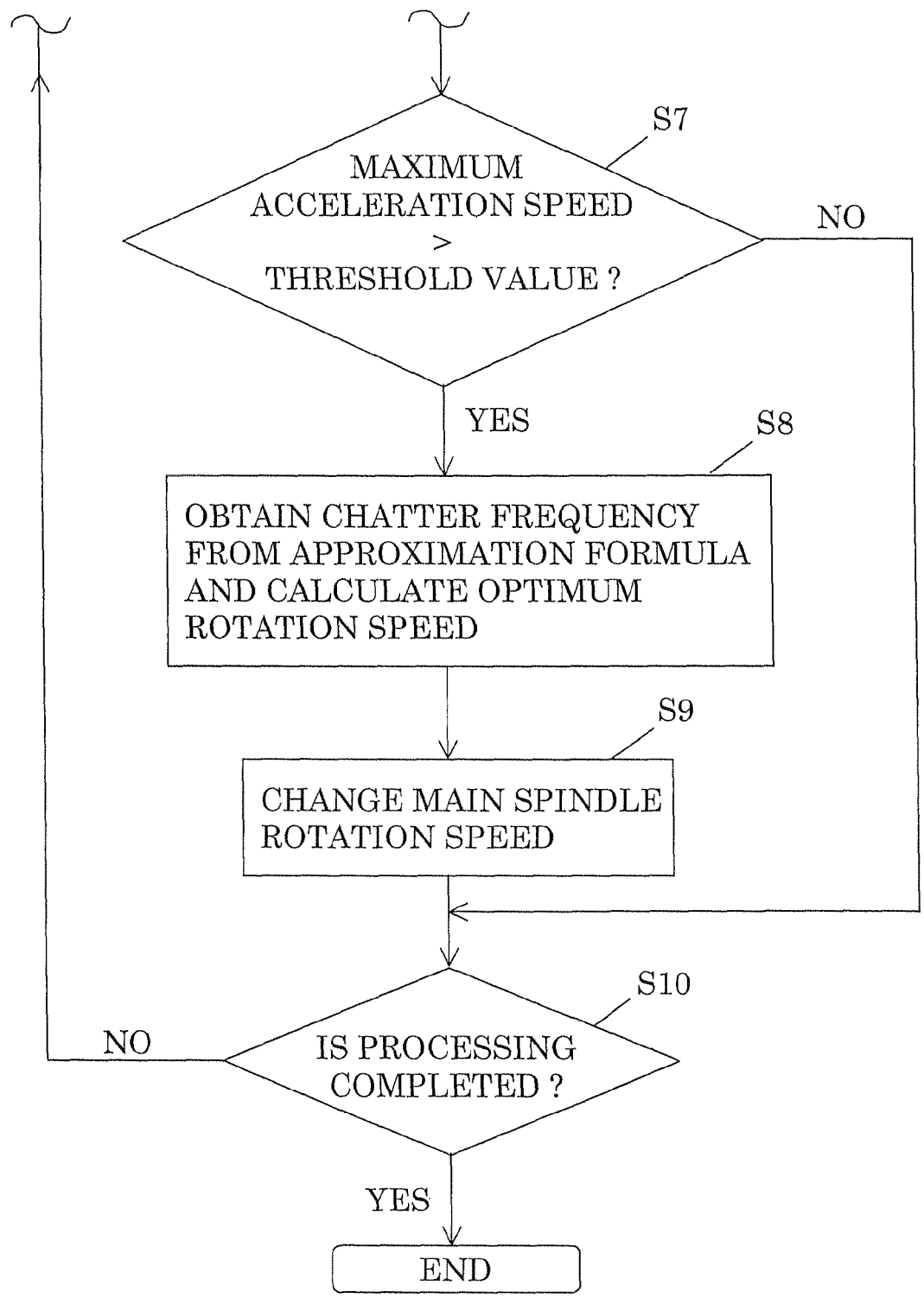

The controller 11 implements a control according to the following vibration suppressing method. To be more specific, the controller 11 carries out Fourier analysis of oscillation amplitude of the main spindle 3 to constantly calculate the maximum acceleration speed and its frequency (chatter frequency). If the maximum acceleration speed exceeds a predetermined threshold value, the controller 11 then calculates the optimum rotation speed and gives instructions together with the predetermined number of tool flutes to the machine tool. Details of the control will be described below with reference to the flow chart of FIG. 4.

At first, a modal parameter is computed. In this operation, a tool used for the machining is attached to the main spindle 3 (step S1), and then a modal parameter in a chatter vibration-generating system is determined (step S2; first step according to the present invention). The modal parameter can be extracted by modal analysis of the determined transfer function. However, if the modal parameter is not accurately determined, an alternative method such as identifying the modal parameter from the machining result may be used. The modal parameter is stored in the storage device 14.

Next, based on the modal parameter obtained in step S2, the FFT calculation device 12 carries out a stability lobe analysis, produces a stability lobe diagram indicating the marginal condition where chatter vibration occurs at the chatter frequency, and determines the target phase difference (target phase information). Further, several points indicating relations between chatter frequency and phase difference (phase information) in the stability lobe diagram are plotted, and the FFT calculation device 12 creates an approximation formula indicating the relation between chatter frequency and phase difference from the plotting result (step S3; second step according to the present invention). Details of the approximation formula will be described later.

After machining is initiated in step S4, vibrational acceleration is detected by the vibration sensors 2a-2c in step S5 (third step according to the present invention). Thereafter, in step S6, the FFT calculation device 12 carries out a Fourier analysis of the detected vibrational acceleration, so as to calculate the maximum acceleration speed which is to be a characteristic value and the chatter frequency corresponding to the maximum acceleration speed (fourth step according to the present invention).

Next, in step S7, the calculation device 13 compares the maximum acceleration speed calculated with the FFT calculation device 12 with the predetermined threshold value, and determines whether or not the maximum acceleration speed exceeds the threshold value. If the maximum acceleration speed exceeds the threshold value, it is determined that chatter vibration occurs, and in step S8, the calculation device 13 obtains the chatter frequency corresponding to the target phase difference using the approximation formula prepared in step S3, and then calculates the optimum rotation speed using the obtained chatter frequency and the number of tool flutes (fifth step according to the present invention). If it is not determined that chatter vibration occurs in step S7, then operation proceeds to step S10 where the machining is finished or the monitoring of vibrational acceleration is continued from step S5.

In step S9, the NC device 15 changes the rotation speed of the main spindle 3 based on the calculation result in step S8, so as to control chatter vibration. If the machining is completed by the determination of step S10, the vibration suppression is finished. Otherwise, operation returns to step S5.

Details of the approximation formula calculated with the FFT calculation device 12 and the manner of calculation of the optimum rotation speed will be described below.

According to Non-patent document 2 as described above, the marginal condition in which chatter occurs at a chatter frequency fc is given by the following formula (1).

Formula (1)

$$F_0 = \frac{1}{2} a_{lim} K_t (1 - e^{-i \cdot 2\pi f_c T})[A_0][G(if_c)]F_0 \quad (1)$$

where Fo is Cutting force vector, alim is Marginal width of cut, Kt is Specific cutting force, T is Tool cutting blade passing cycle, G is Transfer function of a system, and Ao is Coefficient matrix defined by the machining conditions.

Now, if the characteristic value of the matrix [Ao] [G(ifc)] is λ, the relation given by the following formula (2) is obtained.

Formula (2):

$$\lambda F_0 = [A_0][G(if_c)]F_0 \quad (2)$$

Therefore, if the reciprocal of the characteristic value is Λ, the relation given by the following formula (3) is obtained.

Formula (3)

$$\Lambda = \Lambda_R + i\Lambda_I = -\frac{1}{2} a_{lim} K_t (1 - e^{-i \cdot 2\pi f_c T}) \quad (3)$$

Therefore, from the relation of the above formulae (1) and (3), the marginal width of cut alim which generates chatter and the phase difference ε are given by the following formulae (4) and (5).

Formula (4)

$$a_{lim} = -\frac{\Lambda_R}{K_t} \left\{ 1 + \left(\frac{\Lambda_I}{\Lambda_R}\right)^2 \right\} \quad (4)$$

Formula (5)

$$\varepsilon = \frac{\left(\pi - 2\tan^{-1}\frac{\Lambda_I}{\Lambda_R}\right)}{2\pi} \quad (5)$$

Herein, ε indicates a phase difference between the shape of the surface created by the previous cutting blade and the shape of the surface created by the currently used cutting blade. Further, the main spindle rotation speed n at this time is given by the following formula (6).

Formula (6)

$$n = \frac{60 f_c}{N(k+\varepsilon)} \quad (6)$$

where k is an integer equal to or greater than 1, and hereinafter k is expressed as a "k number." N represents the number of tool flutes.

Figure 5:
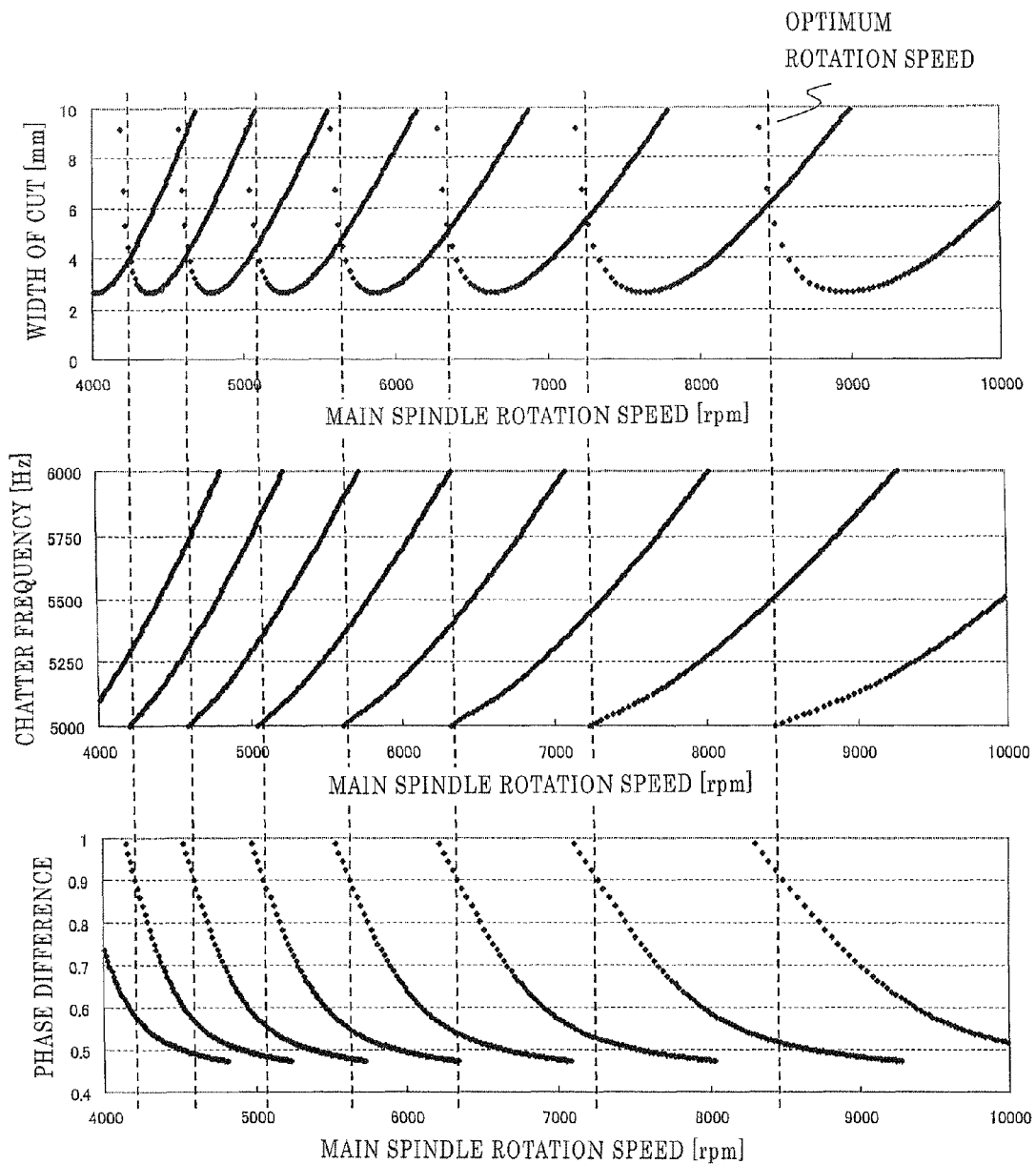
FIG. 5 shows stability lobe diagrams.

The main spindle rotation speed, the phase difference, and the marginal width of cut are obtained relative to each of the chatter frequencies using the above formulae (4) to (6), and the relations thereof are plotted to obtain stability lobe diagrams shown in FIG. 5. In FIG. 5, an area where the marginal width of cut takes a great value represents a stable machining area (see broken lines in the figure). In other words, if chatter occurs during the cutting machining at a certain cutting amount, the main spindle rotation speed is adjusted to fall within the stable machining area, so that chatter vibration is effectively suppressed. For this reason, it is necessary to obtain the main spindle rotation speed corresponding to the stable machining area.

Herein, the relations of stability lobe diagrams shown in FIG. 5 reveal that the cutting process is stably performed if the phase difference (target phase difference) is in the vicinity of 0.9. Therefore, chatter vibration can be suppressed by obtaining the rotation speed, by which the phase difference becomes 0.9, from the formula (6). However, it is necessary here to obtain the chatter frequency corresponding to the intended phase difference. The relation between chatter frequency and phase difference can be obtained from the above formulae (1), (3) and (5), which inevitably involve calculation of the characteristic value. Therefore, although the calculation of the phase difference from the chatter frequency is possible, the inverse operation from the phase difference to the chatter frequency is very difficult. For this reason, the calculations of the formulae (1) through (5) are repeated while increasing the chatter frequency by a constant increment value in a certain range, so as to find out the chatter frequency by which the phase difference is in close vicinity of 0.9. However, this method involves extremely heavy-loaded and time-consuming calculations, and the capacity in solving formulae depends on the constant increment value of the chatter frequency. Therefore, the relation between the amount of calculations and the accuracy of solutions is trade-off.

In view of the above, according to the present invention, the relation between chatter frequency and phase difference is stored as an approximation formula expressed by a Bézier curve or a B-spline curve, so that the chatter frequency corresponding to the target phase difference can be analytically obtained without requiring the above repeated computations. For example, if the Bézier curve is used as an approximate curve, the relation between chatter frequency and phase difference is given by a cubic formula using a parameter t such as shown by the following formula (7).

Formula (7)

$$\begin{bmatrix} f_c \\ \varepsilon \end{bmatrix} = \begin{bmatrix} A_1 & B_1 & C_1 & D_1 \\ A_2 & B_2 & C_2 & D_2 \end{bmatrix} \begin{bmatrix} t_1^3 \\ t_1^2 \\ t_1 \\ 1 \end{bmatrix} \quad (7)$$

Herein, coefficients A, B, C and D in the above formula (7) are determined by the following manner.

Figure 6:
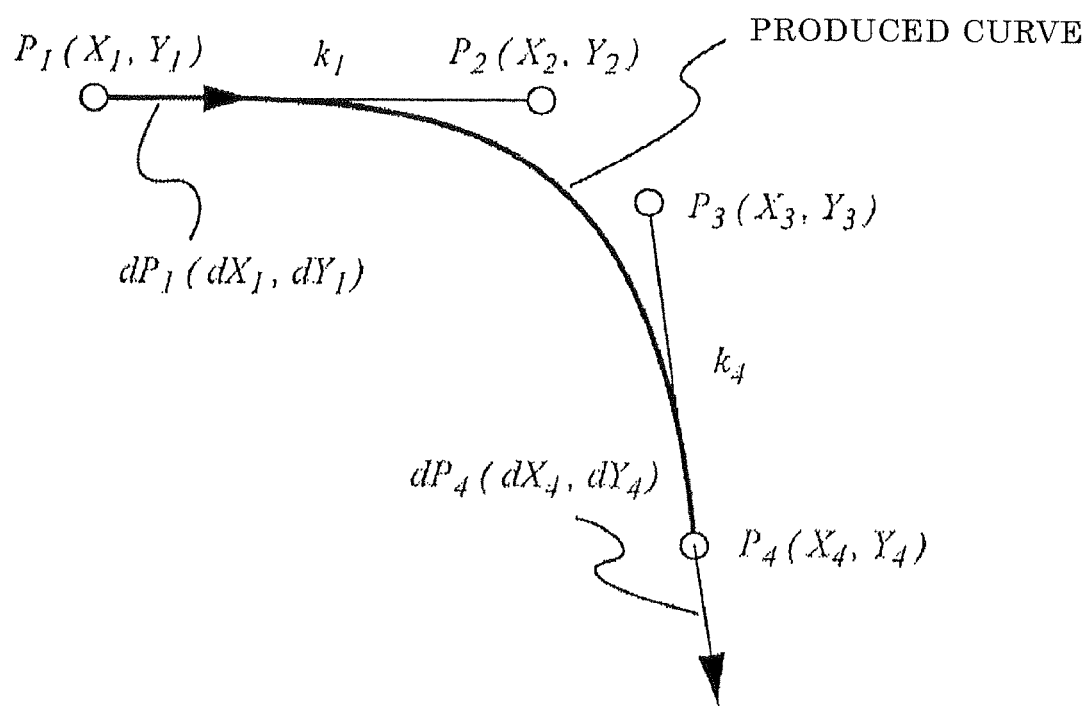
FIG. 6 is an explanatory view showing a general shape of a Bézier curve.

As best seen in FIG. 6, in a cubic Bézier curve, the shape of the curve is determined by four control points (P1-P4). Since in the relation between chatter frequency and phase difference, end points P1, P4 and slopes dP1, dP4 at the end points can be determined from the calculation result, the other two remaining control points will be defined by the following formula (8), and the coefficients A-D can be shown by the following formulae (9) to (12).

Formula (8)

$$\begin{cases} P_2 = P_1 + k_1 \cdot dP_1 \\ P_3 = P_4 - k_4 \cdot dP_4 \end{cases} \quad (8)$$

Formula (9)

$$A = \begin{bmatrix} A_1 \\ A_2 \end{bmatrix} = -P_1 + 3 \cdot P_2 - 3 \cdot P_3 + P_4 \quad (9)$$

Formula (10)

$$B = \begin{bmatrix} B_2 \\ B_2 \end{bmatrix} = 3 \cdot P_1 - 6 \cdot P_2 + 3 \cdot P_3 \quad (10)$$

Formula (11)

$$C = \begin{bmatrix} C_1 \\ C_2 \end{bmatrix} = -3 \cdot P_1 + 3 \cdot P_2 \quad (11)$$

Formula (12)

$$D = \begin{bmatrix} D_1 \\ D_2 \end{bmatrix} = P_1 \quad (12)$$

In the above formulae (8) to (12), only two variable numbers k1, k4 exist as unknown numbers. Therefore, k1 and k4 may be optimized such that the curve (7) conforms with the plotted values of the relation between chatter frequency and phase difference. If the shape of the curve is complicated, the curve is divided at one or more appropriate points into two or more parts, so as to obtain the formula (7) for each of these parts.

Since the relation between chatter frequency and phase difference does not depend on the k number, once the formula (7) is fitted with respect to the modal parameter of a system, this one approximation formula may be retained without consideration of main spindle rotation speed. Of course, with respect to each of the k numbers, the relations among main spindle rotation speed, chatter frequency and phase difference may be provided, so that a plurality of approximation formulae are retained.

Figure 7:
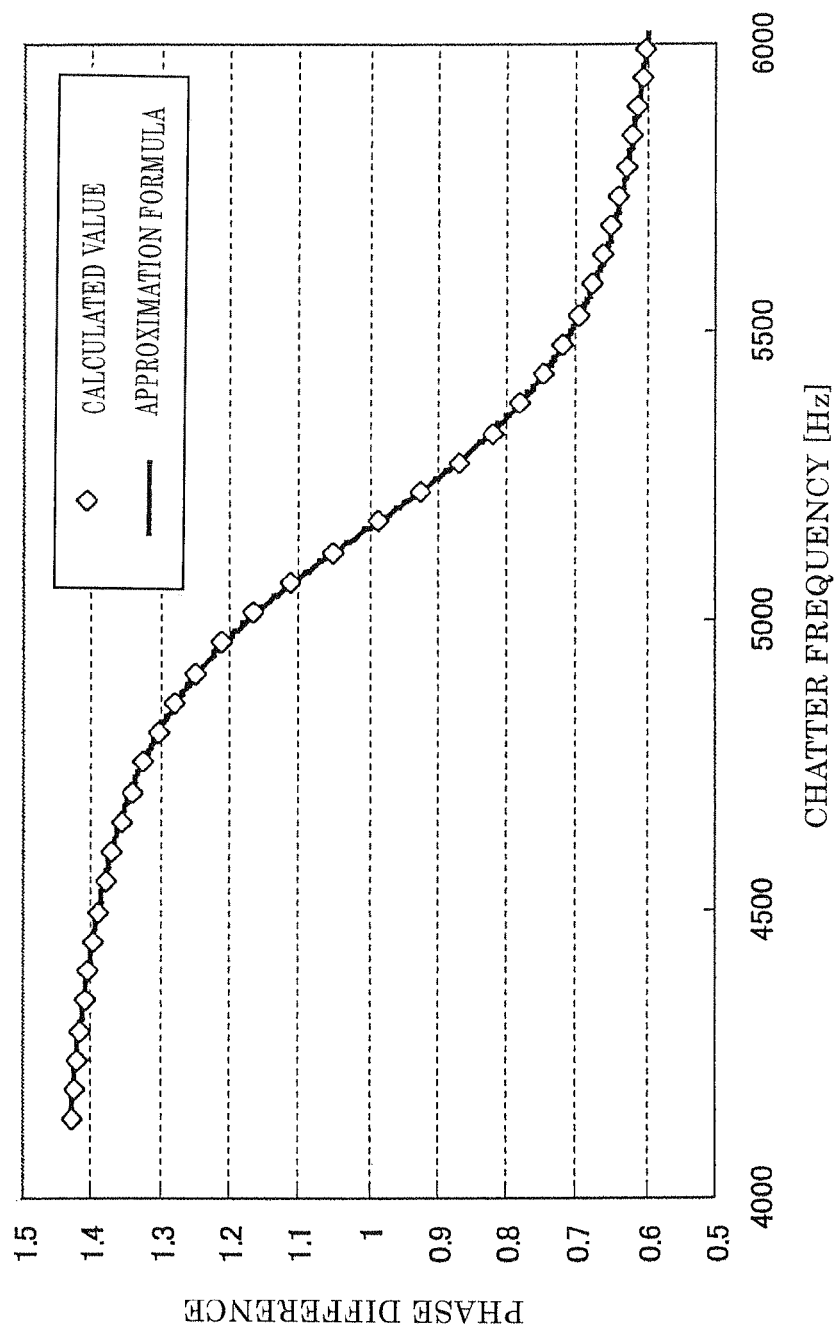
FIG. 7 is a graph showing an example of an approximation formula indicating the relation between chatter frequency and phase difference.
Figure 8:
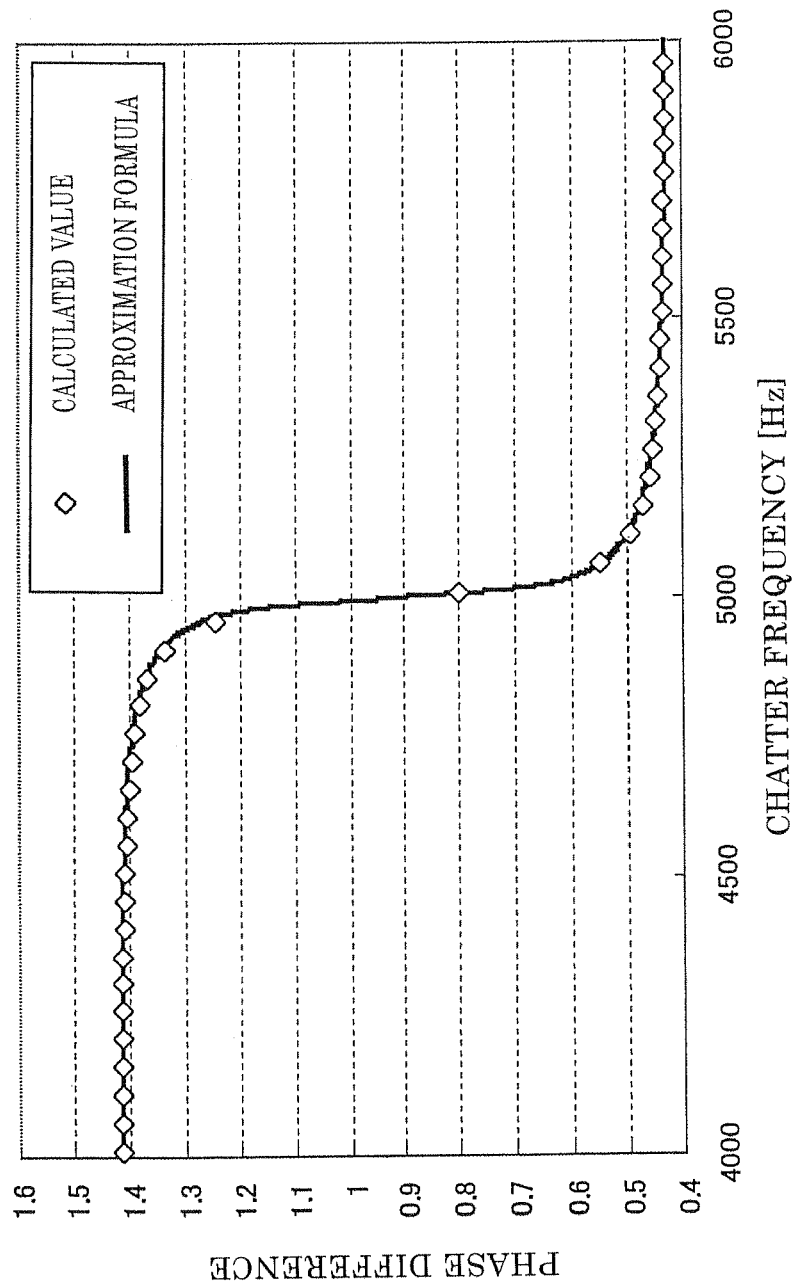
FIG. 8 is a graph showing an example of an approximation formula indicating the relation between chatter frequency and phase difference.

As an example, an approximation is made to two sets of different modal parameters using the formula (7). The result was compared with the result calculated from the formula (5)

by arbitrarily setting the chatter frequency, and are shown in FIGS. 7 and 8. Although the phase difference became discontinuous from the formula (5) with the boundary of 1.0, a serialization was performed for the purpose of simplification.

Figure 9:
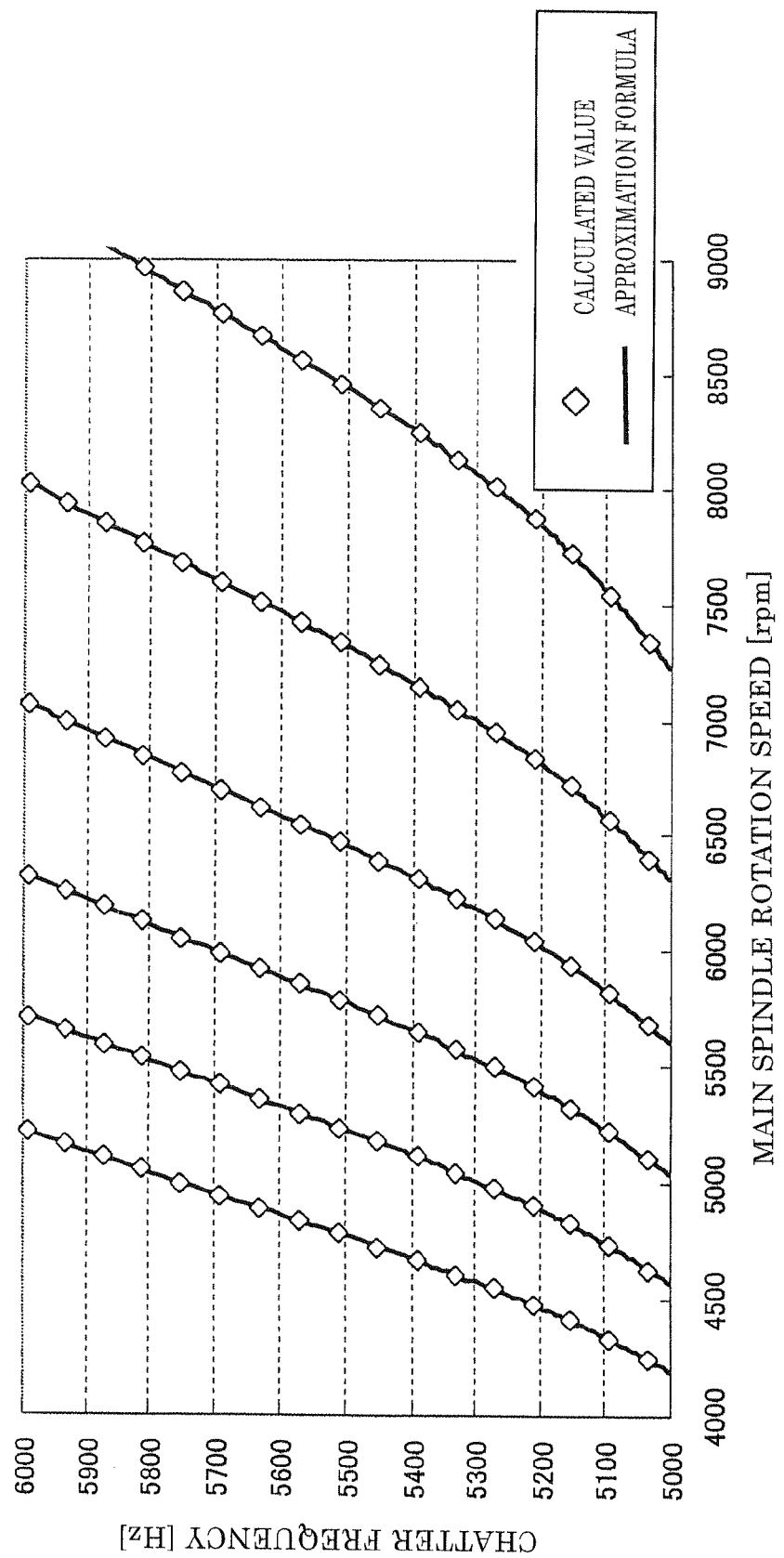
FIG. 9 is a graph showing an example of approximation formulae indicating the relations between main spindle rotation speed and chatter frequency.
Figure 10:
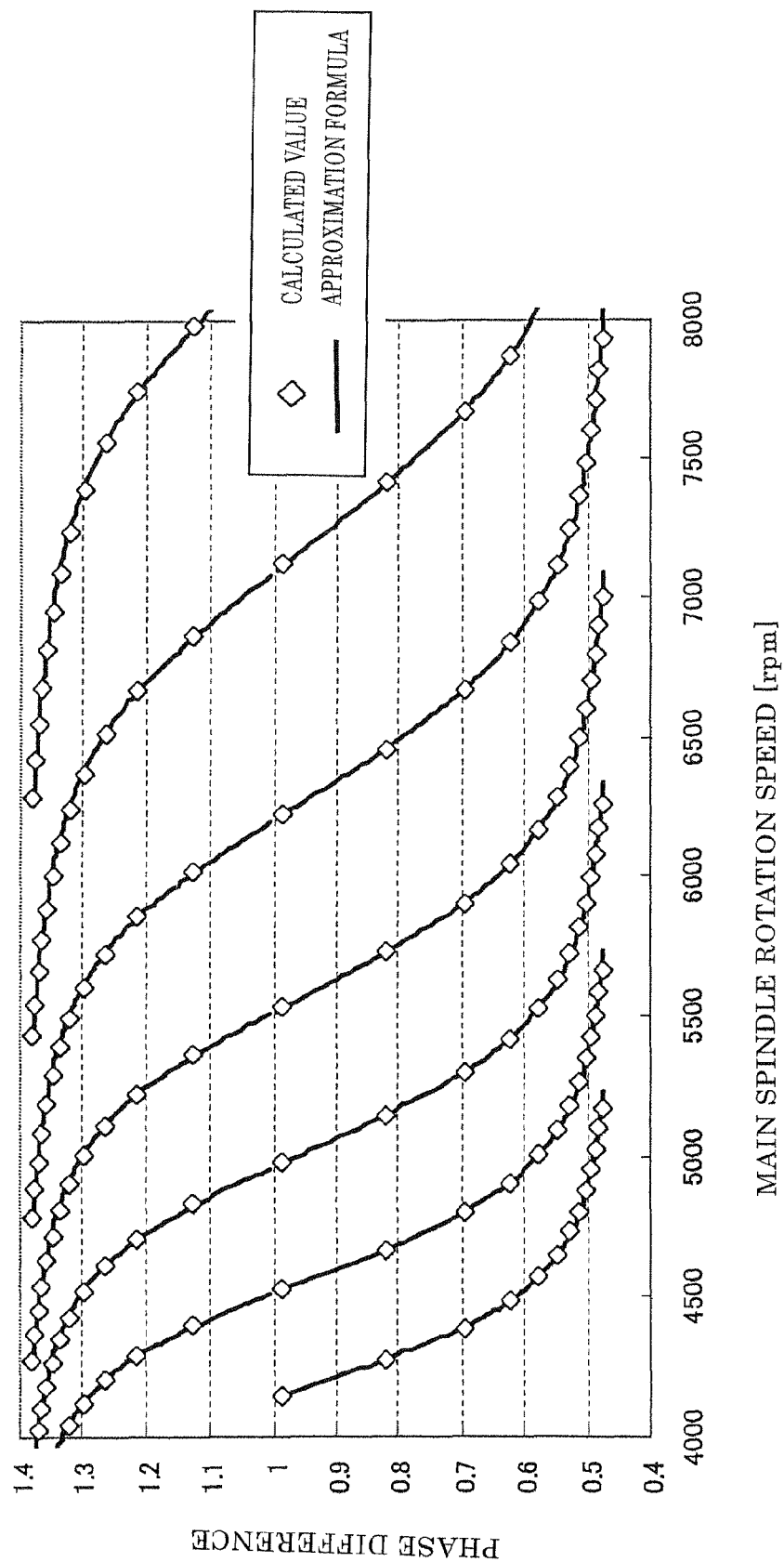
FIG. 10 is a graph showing an example of approximation formulae indicating the relations between main spindle rotation speed and phase difference.

Relations between phase difference and chatter frequency were expressed from approximation formulae of FIGS. 7 and 8. From the formula (6) using these relations, the relation between main spindle rotation speed and chatter frequency and the relation between main spindle rotation speed and phase difference were plotted to obtain FIGS. 9 and 10. As with FIGS. 7 and 8, the results calculated from the formulae (5) and (6) by arbitrarily setting the chatter frequency were shown for the comparison purpose. The results shown in FIGS. 7 through 10 reveal that the approximation formulae according to the method of the present invention are very much conformed with the calculation results obtained from the formulae (5) and (6).

Figure 11:
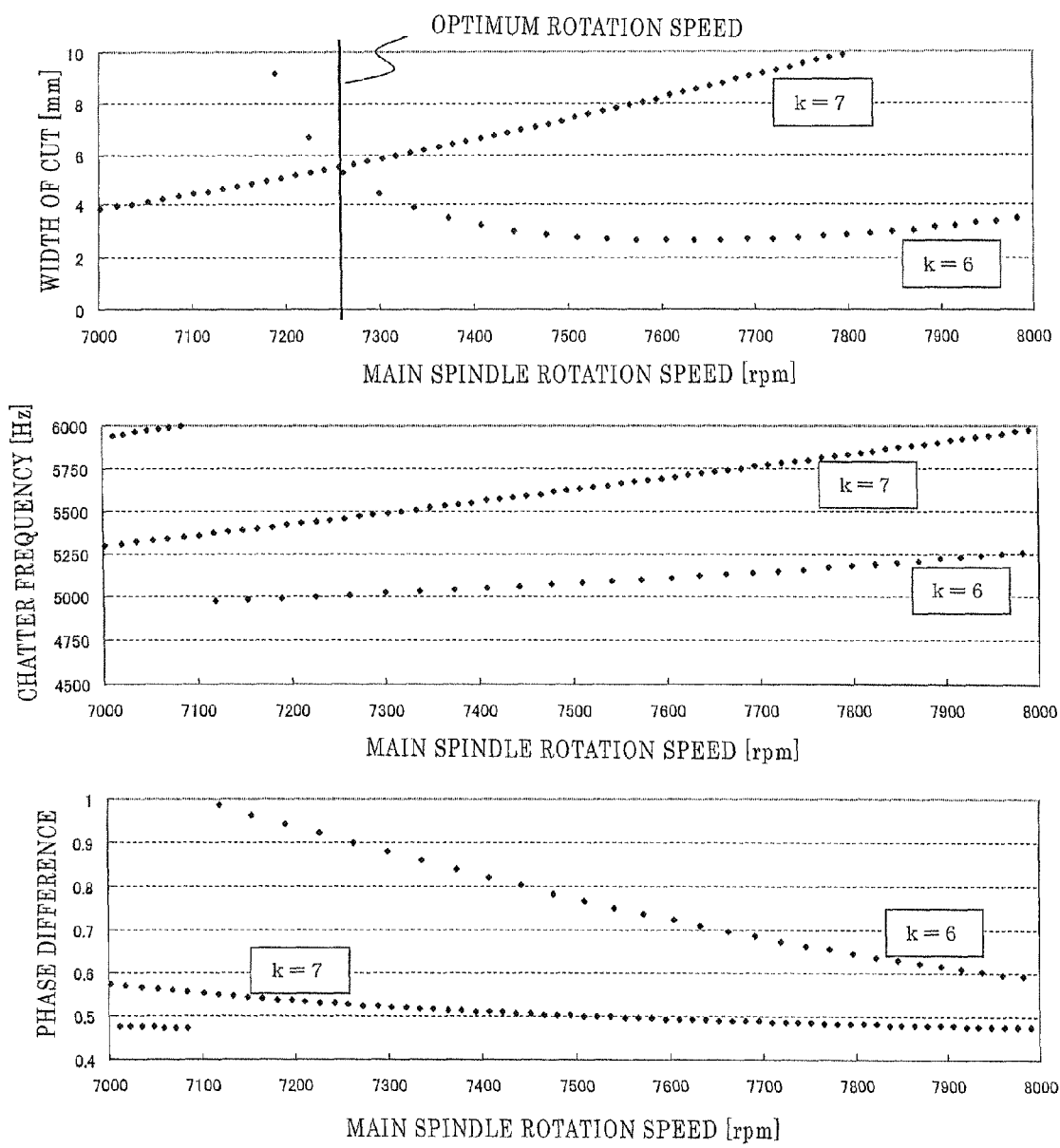
FIG. 11 shows partly enlarged stability lobe diagrams.

Actual calculation examples will be shown below. Stability lobe diagrams obtained by calculations using the modal parameter and the machining conditions of TABLE 1 are shown in FIG. 11. In this instance, if $\epsilon \leq 1.0$ is satisfied, the approximation formula indicating the relation between chatter frequency and phase difference is given by the following formula (13).

TABLE 1

| Natural frequency | Maximum compliance | Damping ratio | Tool diameter | Cutting diameter | Tool flutes |
|---|---|---|---|---|---|
| 5000 Hz | 4.0 μm/N | 0.03 | 6 mm | 0.4 mm | 6 |

Formula (13)

$$\begin{bmatrix} f_c \\ \varepsilon \end{bmatrix} = \begin{bmatrix} 628.3 & -155.4 & 527.5 & 5002.3 \\ -0.321 & 0.991 & -1.118 & 0.923 \end{bmatrix} \begin{bmatrix} t^3 \\ t^2 \\ t \\ 1 \end{bmatrix} \quad (13)$$

$(0 \leq t \leq 1)$

As an example, if the machining is performed at a main spindle rotation speed of 7,500 rpm, the chatter frequency is approximately 5,080 Hz and the phase difference is approximately 0.77. With reference to FIG. 11, the stable rotation speed is read as approximately 7,260 rpm. If a calculation is made by the conventional method on condition that the target phase difference is 0.9 and the chatter frequency is 5,080 Hz, from the formula (6), the calculated optimum rotation speed is 7,362 rpm, which is different from the proper stable rotation speed for approximately 100 rpm.

According to the method of the present invention, a cubic equation with respect to $\epsilon$ is solved in the formula (13). As a result, t corresponding to the phase difference of 0.9 is obtained as approximately 0.02, and the chatter frequency corresponding thereto is 5,010 Hz. If a calculation is made in the formula (6) using this result, the optimum rotation speed is 7,261 rpm. Therefore, the optimum rotation speed can be accurately obtained.

According to the vibration suppressing method and the vibration suppressing device disclosed in the above embodiment, because the optimum rotation speed can be obtained using the approximation formula indicating the relation between chatter frequency and phase difference, it is possible to readily and highly accurately obtain the optimum rotation speed for analytically suppressing chatter vibration, without requiring repeated computations which are heavy-loaded and involve less accurate solutions.

Although the vibration suppressing method and the vibration suppressing device according to the present invention have been described in detail with reference to the above preferred embodiment, the present invention is not limited to the above specific embodiment and various changes and modifications may be made without departing from the scope of the appended claims.

Figure 12A:
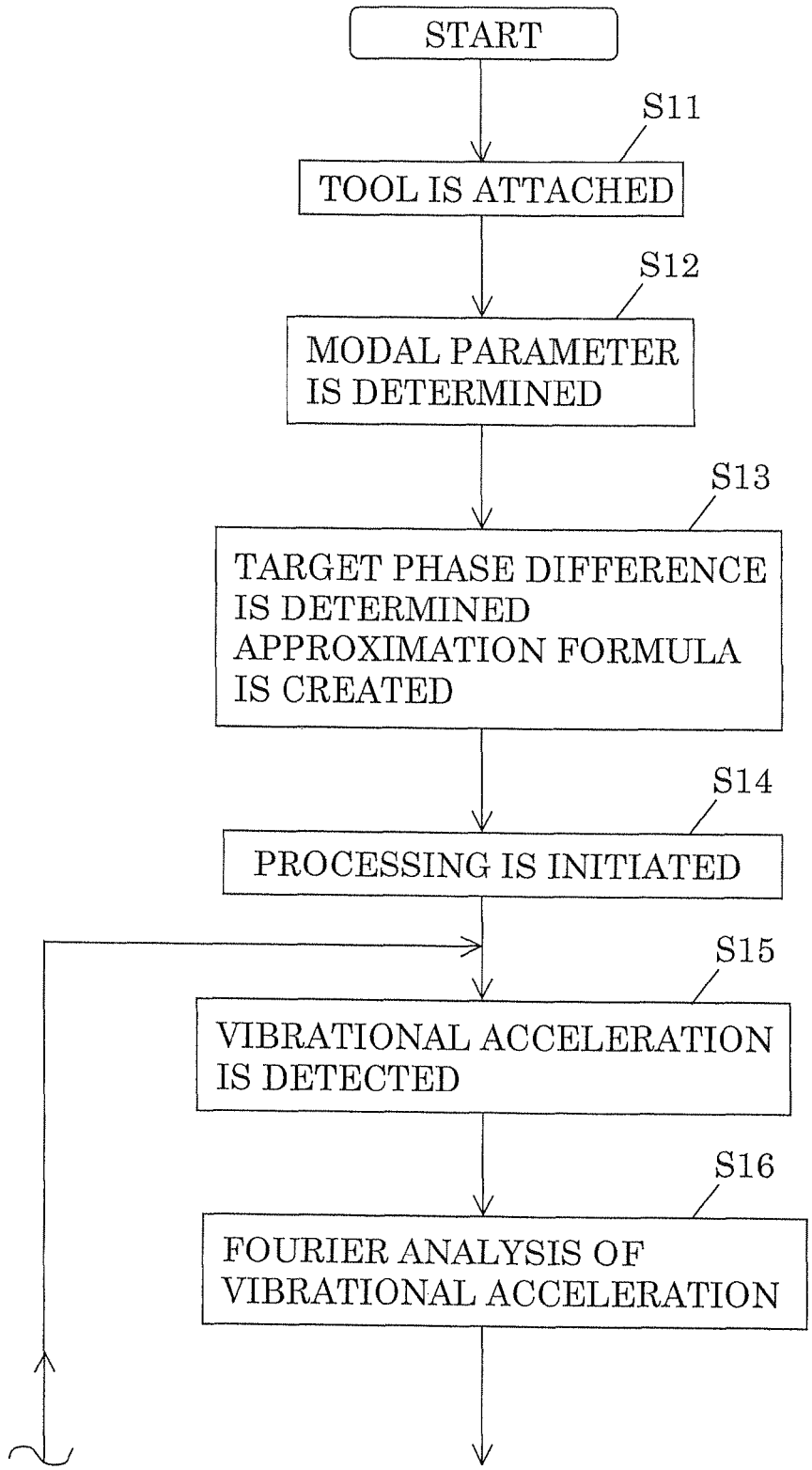
FIG. 12 is a flow chart for vibration suppression control according to a modified embodiment.
Figure 12B:
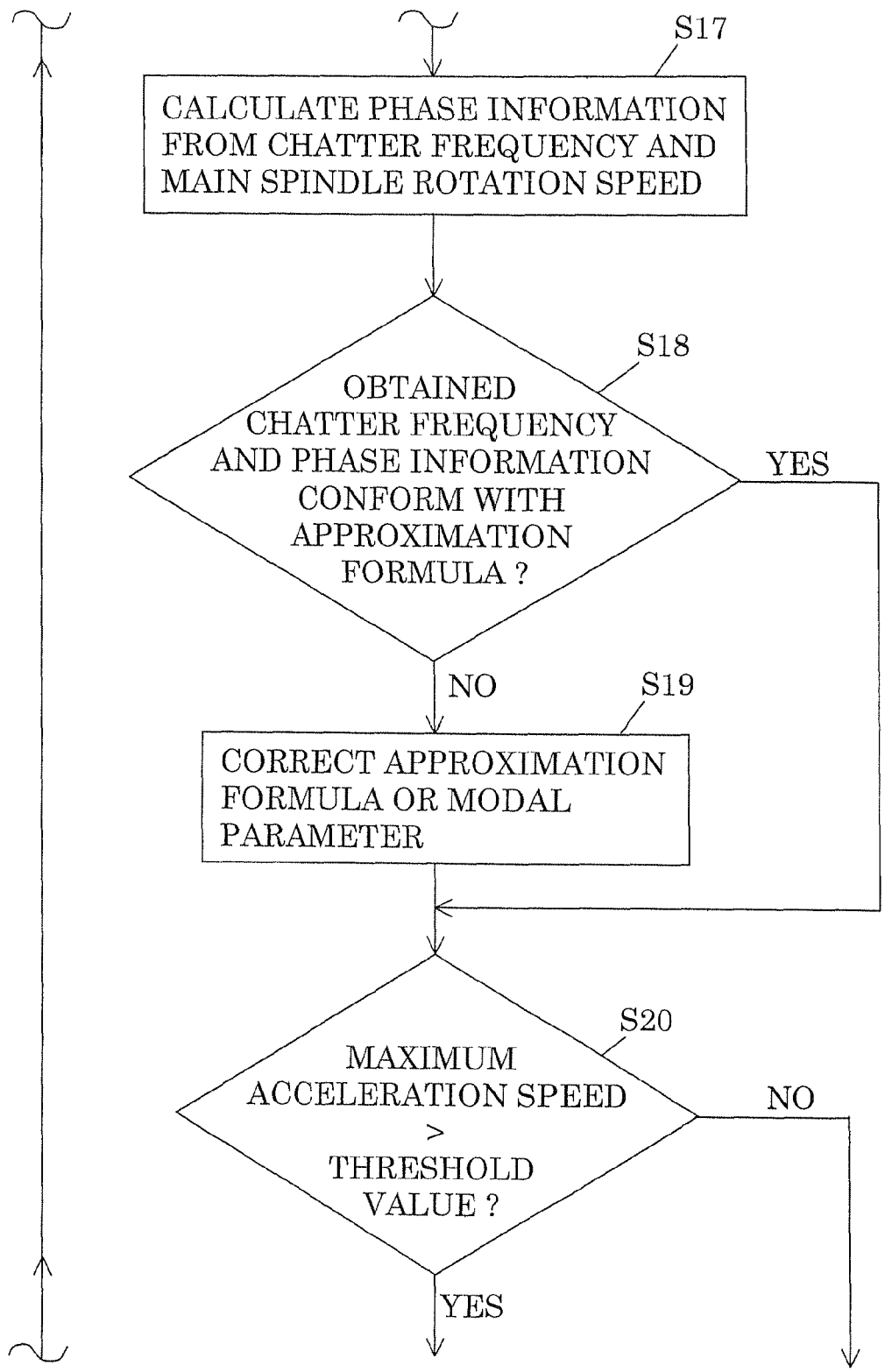
Figure 12C:
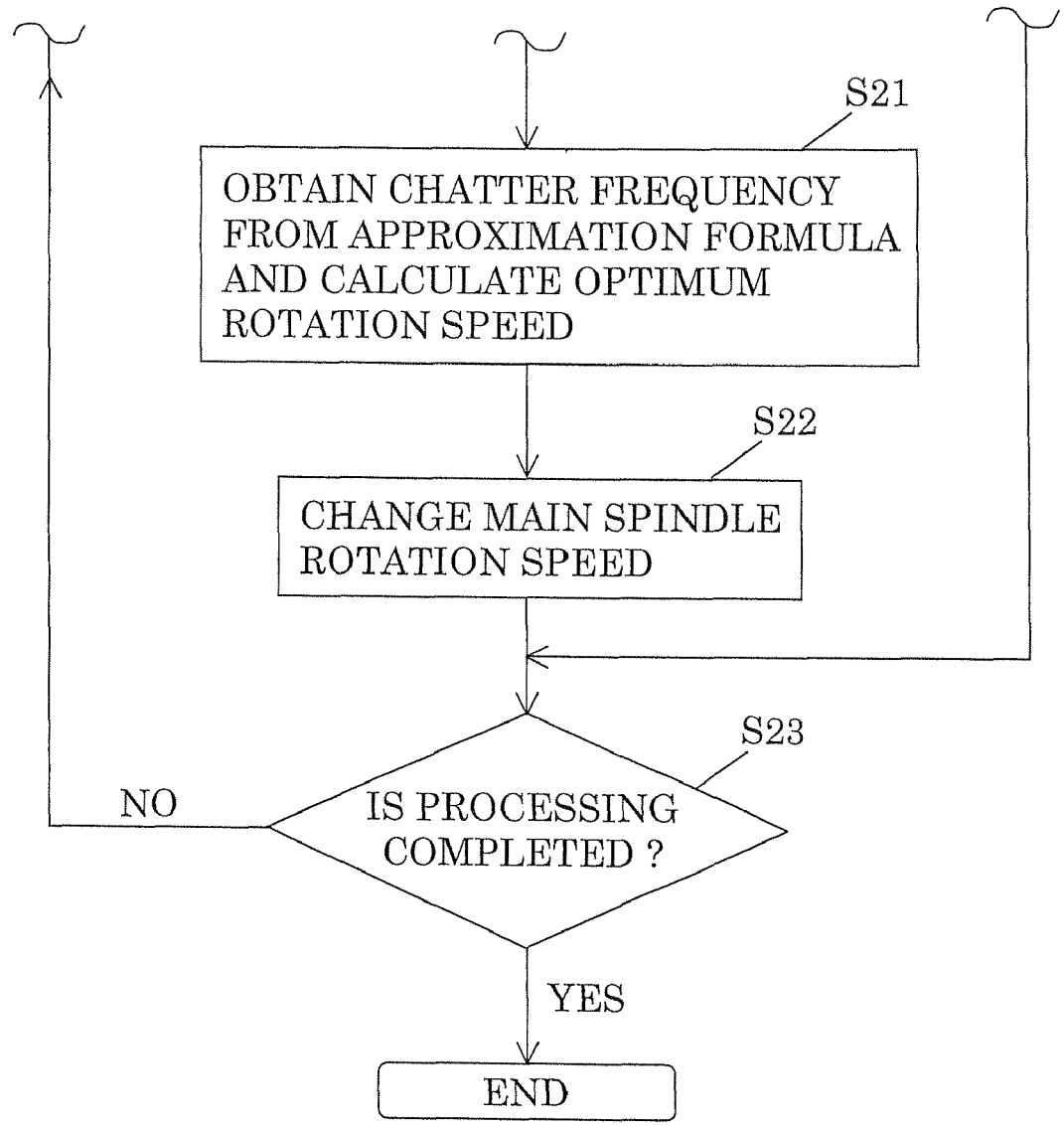

For example, a modification of the vibration suppressing method is shown in FIG. 12. In this modification, after performing Fourier analysis of the vibrational acceleration in step S16, phase information is calculated in step S17 from the chatter frequency and the main spindle rotation speed corresponding to the chatter frequency. Thereafter, a determination is made in step S18 as to whether or not the obtained chatter frequency and the phase information conform with the approximation formula. If they are not in conformity with the approximation formula, then operation proceeds to step S19 so that the approximation formula or the modal parameter is corrected where necessary. Other operations are substantially the same as those described in FIG. 4.

As described above, it is possible to obtain an appropriate optimum rotation speed in accordance with a change in the machining state by correcting the approximation formula or the modal parameter per se where necessary based on the actual machining data.

Further, in the above embodiment, the vibration suppression control is executed by the Fourier analysis of the time-domain vibrational acceleration with using the maximum acceleration speed at which the frequency-domain vibrational acceleration takes the maximum value. However, the vibration suppression control may be modified by using an average of a plurality of peaks at which the value of the vibrational acceleration is superior.

Further, it is not necessary to provide the storage device inside the controller. The storage device may be provided outside the controller. The vibration sensors as the vibration detecting units may be replaced with one or more sensors for detecting displacement of the rotary shaft or acoustic pressure caused by vibration.

In order to obtain the correlation between chatter frequency and phase information, the method disclosed in Non-patent document 2 is used in the above preferred embodiment. However, other relations obtained from other calculation methods may be used in the present invention.

Furthermore, the present invention is applicable to various types of machine tools such as a machining center and an numerically controlled lathe. The installation position of each detecting unit or the number of the detecting units may be modified where necessary, for example, in accordance with a type of the machine tool used.

What is claimed is:

1. A method of suppressing chatter vibration of a machine tool during machining of a workpiece, the machine tool being provided with a rotary shaft for rotating a tool or the workpiece, assuming that a decimal part of a value obtained by a following formula:

60×Chatter frequency/(Number of Tool flutes×Rotation speed of Rotary shaft)

is given as phase information, the method comprising:
  a first step of attaching the tool to the rotary shaft and computing a modal parameter of the tool or the workpiece;

a second step of calculating a relation between chatter frequency and the phase information as an approximation formula based on the modal parameter and machining conditions;

a third step of detecting time-domain vibration caused by the chatter vibration;

a fourth step of calculating a chatter frequency and a frequency-domain characteristic value of the chatter frequency based on the vibration detected in the third step; and a fifth step of obtaining a chatter frequency corresponding to the phase information that has been selected as a target using the approximation formula if the characteristic value calculated in the fourth step exceeds a predetermined threshold value, and thereafter calculating an optimum rotation speed using the obtained chatter frequency and the number of tool flutes.

2. The method of claim 1, wherein in the second step, the approximation formula is expressed by a Bézier curve or a B-spline curve.

3. The method of claim 2, further comprising calculating phase information from the formula:

$$60 \times \text{Chatter frequency}/(\text{Number of Tool flutes} \times \text{Rotation speed of Rotary shaft})$$

using the chatter frequency calculated in the fourth step and the rotation speed of the rotary shaft corresponding to the chatter frequency, and correcting the modal parameter or the approximation formula using the obtained chatter frequency and the phase information.

4. The method of claim 1, further comprising calculating phase information from the formula of claim 1 using the chatter frequency calculated in the fourth step and the rotation speed of the rotary shaft corresponding to the chatter frequency, and correcting the modal parameter or the approximation formula using the obtained chatter frequency and the phase information.

5. A vibration suppressing device for suppressing chatter vibration of a machine tool during machining of a workpiece, the machine tool being provided with a rotary shaft for rotating a tool or the workpiece, assuming that a decimal part of a value obtained by the following formula:

$$60 \times \text{Chatter frequency}/(\text{Number of Tool flutes} \times \text{Rotation speed of Rotary shaft})$$

is given as phase information, the vibration suppressing device comprising:

a determination unit configured to compute a modal parameter of the tool or the workpiece while the tool is attached to the rotary shaft;

a first calculation unit configured to calculate a relation between chatter frequency and the phase information of the tool flutes as an approximation formula based on the modal parameter and machining conditions;

a vibration detecting unit configured to detect time-domain vibration caused by the chatter vibration;

a second calculation unit configured to calculate a chatter frequency and a frequency-domain characteristic value of the chatter frequency based on the vibration detected by the vibration detecting unit; and a third calculation unit configured to obtain a chatter frequency corresponding to the phase information that has been selected as a target using the approximation formula if the characteristic value calculated by the second calculation unit exceeds a predetermined threshold value and thereafter to calculate an optimum rotation speed using the obtained chatter frequency and the number of tool flutes.

* * * * *